May 12, 1959 E. J. WELLAUER 2,885,871
FLEXIBLE SHAFT-COUPLING
Filed March 5, 1958 2 Sheets-Sheet 1

INVENTOR
EDWARD J. WELLAUER

BY Juarles, Fox, Seidel,
Bateman + Hoar
ATTORNEYS

United States Patent Office 2,885,871
Patented May 12, 1959

2,885,871

FLEXIBLE SHAFT-COUPLING

Edward J. Wellauer, Wauwatosa, Wis., assignor to The Falk Corporation, Milwaukee, Wis., a corporation of Wisconsin Application March 5, 1958, Serial No. 719,425

4 Claims. (Cl. 64—15)

This invention relates to flexible shaft-couplings in which the coupling members are formed with axially directed peripheral grooves, and are operatively connected together in driving relation by resilient interconnecting members fitting in and drivingly connecting the said grooves of both coupling members.

The resilient interconnecting members are known to the trade as "grids." The invention is equally applicable to couplings having continuous zig-zag grids (such as shown and described in Bibby Patent No. Re. 15,903) and to couplings having a succession of separate grid elements (such as shown and described in Wellauer Patent No. 2,555,909).

The object of such couplings is to provide torsional resiliency, which may be defined as the ability to spread peak or shock loads over a relatively long increment of time, thereby greatly reducing the stresses in the connected machinery.

Structures of either sort exemplified by the two above-cited patents have in common the characteristic that, in special uses which involve considerable differences in load, the span between the point of contact of each limb of the grid with one coupling member, and the point of contact of that limb with the other coupling member, contracts with increasing rapidity to such an extent as to greatly decrease the resilience of the connection at just the time when resiliency is most needed, and also to render the grid subject to shear stresses between the two points.

Accordingly the principal object of the present invention is to reduce this shortening effect, with respect to a wide spread in load; in other words to provide greater resiliency under sudden and heavy peak loads.

Another object is to increase the increment of time over which the peak and shock loads are spread.

Another object is to provide, without increasing the size of the coupling, a coupling which will satisfactorily cushion peak and shock loads in special uses which involve greater such loads when rotating in one direction than when rotating in the other, or which involve rotation in only one direction.

Other objects and advantages will appear in the description which follows.

In the description, reference is made to the accompanying drawings, forming a part hereof, in which there is shown, by way of illustration and not of limitation, a certain specific form in which the machine of the present invention may be embodied.

Figure 4:
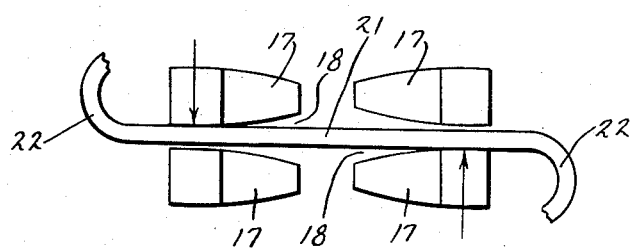
Figure 5:
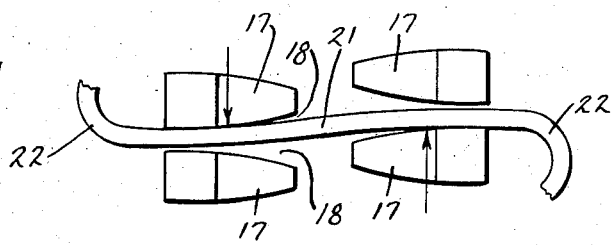
Figure 6:
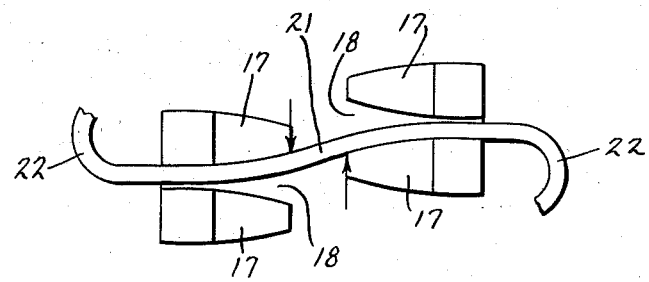

Fig. 4 represents the same in another position.
Fig. 5 represents the same in another position.
Fig. 6 represents the same in another position.

Figs. 3 to 6 have two different significances, according as they are taken to represent the prior art or the present invention; all of which will be explained later herein.

Throughout the drawings, the same reference-numeral is applied to the same member, or to similar members.

Referring now to the drawings, the numerals 11 and 12 designate substantially axially aligned shafts, either one of which may be the driver and the other the driven, provided that the driving shaft turns in the direction of the arrow thereon, in which event the arrow on the driven shaft represents the direction of torsional resistance of that shaft to being driven.

13 is a coupling element for each shaft secured thereto for driving or to be driven by a key 14, secured against endwise movement by a set-screw 16.

Each coupling element 13 is provided with a series of circumferentially-spaced radially-projecting teeth 17 at that face of the coupling element which faces the other coupling element. These teeth form between them a series of axially directed peripheral grooves 18, the teeth being so shaped that these grooves flare at the face of the coupling element. These teeth are preferably equally spaced, and by the same token so are the grooves.

Lying in the grooves of both coupling elements, and interlacing the teeth thereof, there is a resilient grid 19, comprising torque-transmitting limbs 21, and connecting end-portions 22. Although as shown herein this grid is continuous, yet as stated earlier herein, this is not essential. Furthermore the limbs and end pieces may be of flat spring metal, or of spring wire, or of several pieces of spring wire side by side, or any other resilient material. But it is essential, in fact is the essence of the present invention, that successive limbs and the intervening connecting portion be together so preformed that the limbs will be inclined from parallelism with the axis of the two coupling elements. The reason for this will be explained later herein.

The grid and the adjoining ends of the two coupling elements are enclosed in a housing formed of two complementary flanged cylindrical housing members 23, whose flanges 24 carry rubber rings 26 which slidably fit the cylindrical surface 27 of each coupling element 13, said housing members 23 having flanges 28 secured together by a series of bolts 29. A rubber sealing ring 31 is disposed between the flanges 28. The housing is preferably packed with grease or other suitable lubricant.

Let us now consider Figs. 3 to 6.

Each of these figures shows two teeth 17 of each coupling element, these two teeth defining a flared groove 18. A fraction of the grid is shown, consisting of one limb 21 and two end portions 22, the limb being disposed in one groove 18 of each coupling element.

The two arrows indicate the points of applied pressure of one tooth 17 of each coupling element against resilient limb 21.

As already stated earlier herein, this set of figures has two different significances.

Let us first consider the prior art.

The grid is inserted, not under load, as shown in Fig. 4. As load begins to be applied, it is applied as indicated by the two arrows in Fig. 4.

Under normal load the condition approximates that shown in Fig. 5.

Under peak loads and shock loads the condition rapidly approaches that shown in Fig. 6. The span between the two arrows has contracted to such an extent that the drive has lost much of its resiliency.

Let us now consider, in contrast, the succession of positions assumed by the device of the present invention.

Figure 3:
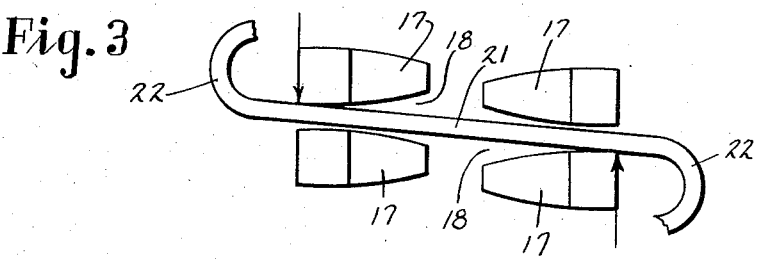
Fig. 3 represents a side elevation showing: two teeth of one coupling element, two teeth of the other coupling element, and one limb and two adjacent end portions of the grid; all in one position of relative rotation of the two coupling elements.

The grid is inserted preformed, not under load, as shown in Fig. 3. As load begins to be applied, it is applied as indicated by the two arrows in Fig. 3.

Under normal load the condition approximates that shown in Fig. 4.

Under peak loads and shock loads the condition rapidly approaches that shown in Fig. 5, but rarely approaches that shown in Fig. 6. Thus even under peak loads and shock loads the span between the two arrows is still relatively uncontracted, and hence a relatively undiminished resiliency is maintained over a wider range of load than in the prior art.

Figure 1:
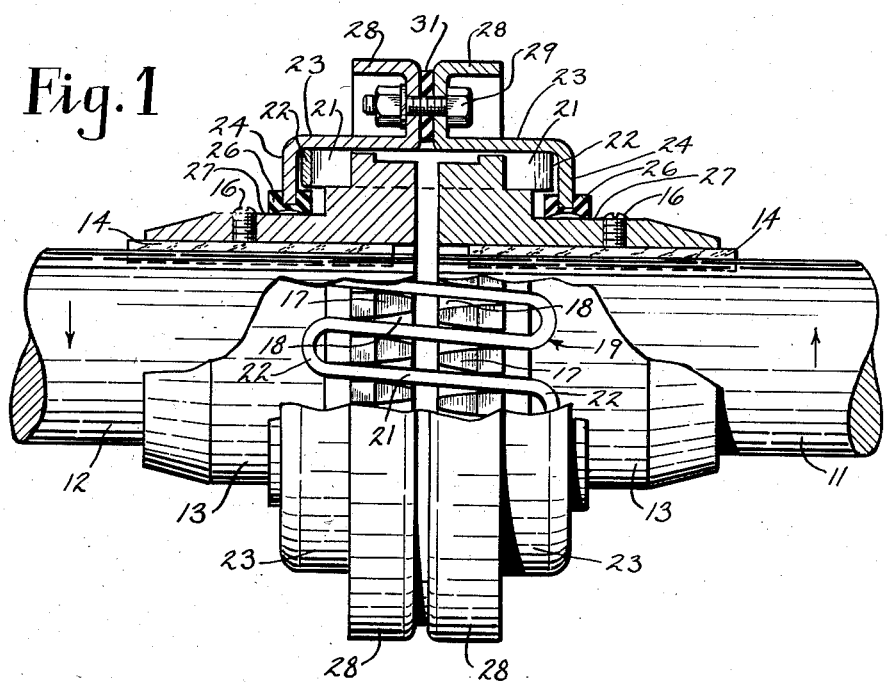
Fig. 1 is a side elevation, with parts broken away and parts shown in section, of a coupling embodying the invention in an unloaded condition.
Figure 2:
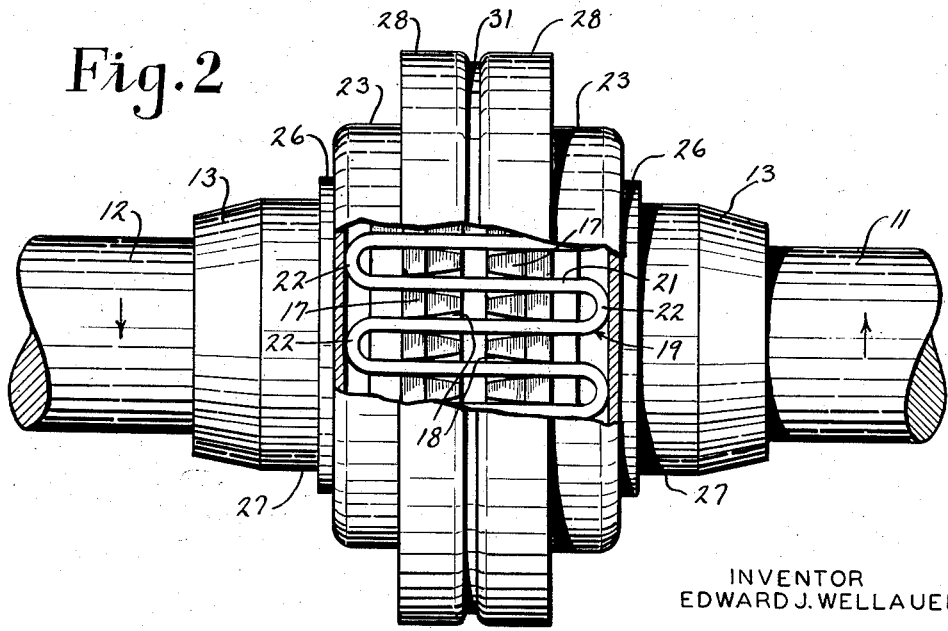
Fig. 2 is a side elevation, with parts broken away, of the same structure under load.

Any appreciable preformed inclination of limbs is advantageous. The more preformed inclination the better, provided the preformed inclination is not so great as to render difficult fitting the preformed limbs into the grooves. For use with teeth of present standard design, the preformed inclination of the limbs should be from 1½ to 3 degrees. It is shown slightly exaggerated in Figs. 1 and 3.

The above comparison of spans, without and with preformed limbs, is of course predicated on a certain degree of resiliency; but demonstrates that regardless of the degree of resiliency chosen a less close approach to Fig. 6 conditions will result if the limbs are preformed than if not, and that this difference will be more marked, the greater the preforming.

With the above in mind, the grid should be designed by cut-and-try to be resilient enough so that, when preformed, the conditions of Fig. 5 should be approximately attained with no nearer approach to Fig. 6 conditions, under the greatest shock and peak loads to be expected.

It will be readily evident from the foregoing description that this invention affords an improvement over the flexible shaft-couplings of the prior art.

Now that one embodiment of the invention has been shown and described, and a variation therefrom has been suggested, it is to be understood that the invention is not to be limited to the specific form or arrangement of parts herein shown and described, or suggested.

What is claimed is:

1. A flexible shaft-coupling, comprising: a pair of coaxial coupling elements capable of at least limited relative rotation about their common axis, each such element being provided adjacent the face facing the other with a series of circumferentially spaced radially projecting driving teeth, which teeth define between them a series of axially directed peripheral grooves, the teeth being so shaped that each groove flares at the face of its coupling element; means for drivingly securing these coupling elements to the ends of their respective shafts; and a grid interlacing the teeth of both coupling elements, and thereby resiliently drivingly connecting said coupling elements, said grid comprising a series of torque-transmitting resilient limbs, each lying in a groove of each coupling element, and a series of end portions each connecting successive limbs; wherein said grid is so preformed that when unloaded its limbs are initially inclined from parallelism to the axis of the coupling elements, but approach parallelism to the axis when loaded.

2. A flexible shaft-coupling, according to claim 1, wherein the initial unloaded inclination from parallelism is appreciable, but not sufficient to render difficult the insertion of the preformed grid into the grooves.

3. A flexible shaft-coupling, comprising: a pair of coaxial coupling elements capable of at least limited relative rotation about their common axis, each such element being provided adjacent the face facing the other with a series of circumferentially spaced radially projecting driving teeth, which teeth define between them a series of axially directed peripheral grooves, the teeth being so shaped that each groove flares at the face of its coupling element; means for drivingly securing these coupling elements to the ends of their respective shafts; and a grid interlacing the teeth of both coupling elements, and thereby resiliently drivingly connecting said coupling elements, said grid comprising a series or torque-transmitting resilient limbs, each lying in a groove of each coupling element, and a series of end portions each connecting successive limbs; wherein said grid is so preformed that when it is unloaded its limbs are initially substantially straight and inclined from parallelism to the axis of the coupling elements, but when loaded its limbs, still substantially straight, will approach and pass through parallelism to the axis.

4. A flexible shaft-coupling, according to claim 2, wherein the initial unloaded non-alignment of grooves is appreciable, but not sufficient to render difficult the insertion of the preformed grid into the grooves.

References Cited in the file of this patent

UNITED STATES PATENTS

| 1,391,713 | Bibby | Sept. 27, 1921 |

FOREIGN PATENTS

| 714,420 | Germany | Dec. 2, 1941 |